US006796499B1

United States Patent
Wang

(10) Patent No.: US 6,796,499 B1
(45) Date of Patent: Sep. 28, 2004

(54) PARKING TOLL SYSTEM

(75) Inventor: Meifen Wang, P.O. Box 1-79, Taipei 100 (TW)

(73) Assignee: Meifen Wang, Denver, CO (US)

( * ) Notice: Subject to any disclaimer, the term of this patent is extended or adjusted under 35 U.S.C. 154(b) by 0 days.

(21) Appl. No.: 09/538,880

(22) Filed: Mar. 30, 2000

(51) Int. Cl.[7] .............................................. G07B 15/02
(52) U.S. Cl. ...................... 235/384; 705/13; 340/932.2
(58) Field of Search ..................... 235/384; 379/114.28, 379/121.06, 111, 130, 114, 121; 705/13; 340/932.2

(56) References Cited

U.S. PATENT DOCUMENTS 5,845,268 A  * 12/1998  Moore ..................... 340/932.2
5,940,481 A  *  8/1999  Zeitman ...................... 379/114
5,991,749 A  * 11/1999  Morrill, Jr. ................... 705/13
6,081,205 A  *  6/2000  Williams ..................... 235/381
6,188,328 B1 *  2/2001  Ho ......................... 340/309.15
6,373,442 B1 *  4/2002  Thomas et al. ............... 343/67

FOREIGN PATENT DOCUMENTS

DE     198 28 951 A1 *  1/2000
WO     wo 96/11453    *  4/1996
WO     WO 99/48062    *  9/1999

* cited by examiner

Primary Examiner—Diane I. Lee
(74) Attorney, Agent, or Firm—Ware, Fressola, Van Der Sluys & Adolphson LLP

(57) ABSTRACT

Parking toll systems comprising on-street parking toll system and parking lot toll system is disclosed. Parking management of the systems is achieved through a mobile phone or a dedicated phone line for internet connection. Also, parking toll is included in user's phone bill.

2 Claims, 12 Drawing Sheets

PARKING TOLL SYSTEM

BACKGROUND OF THE INVENTION

1. Field of the Invention

The present invention relates to a system for managing parking toll, and more particularly to a parking toll system effected through the operation of mobile phone.

2. Description of Related Art

Parking toll systems are generally categorized as on-street parking toll and parking lot toll systems. As to on-street parking toll, it is further categorized as coin operated parking meter and tollbooth which are detailed below. As to coin-operated parking meter on the street, driver must prepare sufficient coins prior to parking. Note that sufficient coins means the amount of coins that driver has to prepare according to the period of time which he/she intends to occupy that parking space. In a typical example, driver first inserts coin(s) into the parking meter prior to legally occupying the parking space. In some cases, parking meter is designed to have only accommodate a maximum of a certain period of time per use. As such, driver has to return to that space to insert coin(s) again if he/she wants to continue to occupy that space when the time is about to expire. Driver can not have his/her extra coin(s) return if he/she leave earlier than expected. Also, such parking space is not available for service if the coin box is full.

As to tollbooth, a toll keeper must repeatedly inspect those parking meters. If there is a vehicle parked in one of the parking spaces, toll keeper will immediately issue a ticket to that vehicle and retain the stub. Toll keeper will issue a new ticket if the vehicle still occupies that parking space when predetermined parking time is expired. Alternatively, toll keeper changes the parking time on the previous ticket and stub. Further, driver has to pay the toll at leaving. At end of work, toll keeper must calculate and check the money received prior to forwarding the money and stubs to parking management office. Also, the office has to create record(s), file, and do all the other maintenance. In view of the foregoing, the whole toll process is very tedious, time consuming, and inconvenient.

In one type of on-street parking toll system, a parking ticket is issued to driver at entrance of parking lot by a toll keeper or a time clock. Likewise, a toll is charged to driver at exit of parking lot by a toll keeper or a time clock when driver leaves. Similarly, at end of work, toll keeper must calculate and check the money received prior to forwarding the money to parking management office. Also, the office has to create record(s), file, and do all the other maintenance. As such, the whole toll process is also very tedious, time consuming, and inconvenient.

In another type of onstreet parking toll system, a card is issued to driver automatically at the entrance. Then gate bar is lifted to allow vehicle to pass through. Driver should insert coin(s) at collector device in order to activate the device to print a leaving time on the card. Then, the driver drives the vehicle to the exit to insert card in the card reader. Finally, gate bar is lifted again to allow vehicle to leave once payment is validated by the card reader. This technique also suffers the drawbacks of being tedious and time consuming. Further, driver should prepare coin(s) in advance.

As to the mobile phone systems employed by a mobile phone company, there are GSM (Global System for Mobile Communications), CDMA (Code Division Multiple Access), TDMA (Time Division Multiple Access), and AMPS (Advanced Mobile Phone Service) available now in which GSM is the most widely employed. It is also known that Data Service equipment is provided in each of above systems including SMS (Short Messaging Services), WAP (Wireless Application Protocol), GPRS (General Packet Radio Services), and MLS (Mobile Location Services). Each of above Data Services is applicable to the invention as detailed later. As to the SMS, for example, you can leave your message in a voice mail box if you make a call to a turned-off mobile phone. Voice mail box will immediately inform the called party that there is a message recorded once the mobile phone is turned on because the SMS function provided by GSM is activated simultaneously. It is quite convenient. As such, the SMS is further illustrated by means of GSM as detailed below.

Terms Definition
(1) SM (Short Message);
(2) SMS (Short Message Service);
(3) SC (Service Center);
(4) SME (Short Message Entity);
(5) SMS-GMSC (Gateway MSC for SMS);
(6) MSC (Message Service Center); and
(7) MS (Message Service).

Network Structure

As shown in FIG. 15, an SME is sent to MSC through SC and SMS-GMSC. Consequently, an MS is performed in compliance with European Telecommunication Standard. SMS comprises storing and access both available on mobile phone services. This invention aims at expanding the application of mobile phone in parking toll by providing a system with specifically designed associated hardware and software.

SUMMARY OF THE INVENTION

It is thus an object of the present invention to provide a parking toll system without requiring driver to prepare coin(s) in advance and pay the toll at parking or leaving. This system is performed through a simple operation of driver's mobile phone.

It is another object of the present invention to provide a convenient, labor saving, and effective toll collecting system for the management of parking facilities.

The above and other objects, features and advantages of the present invention will become apparent from the following detailed description taken with the accompanying drawings.

DETAILED DESCRIPTION OF THE PREFERRED EMBODIMENTS

Figure 1:
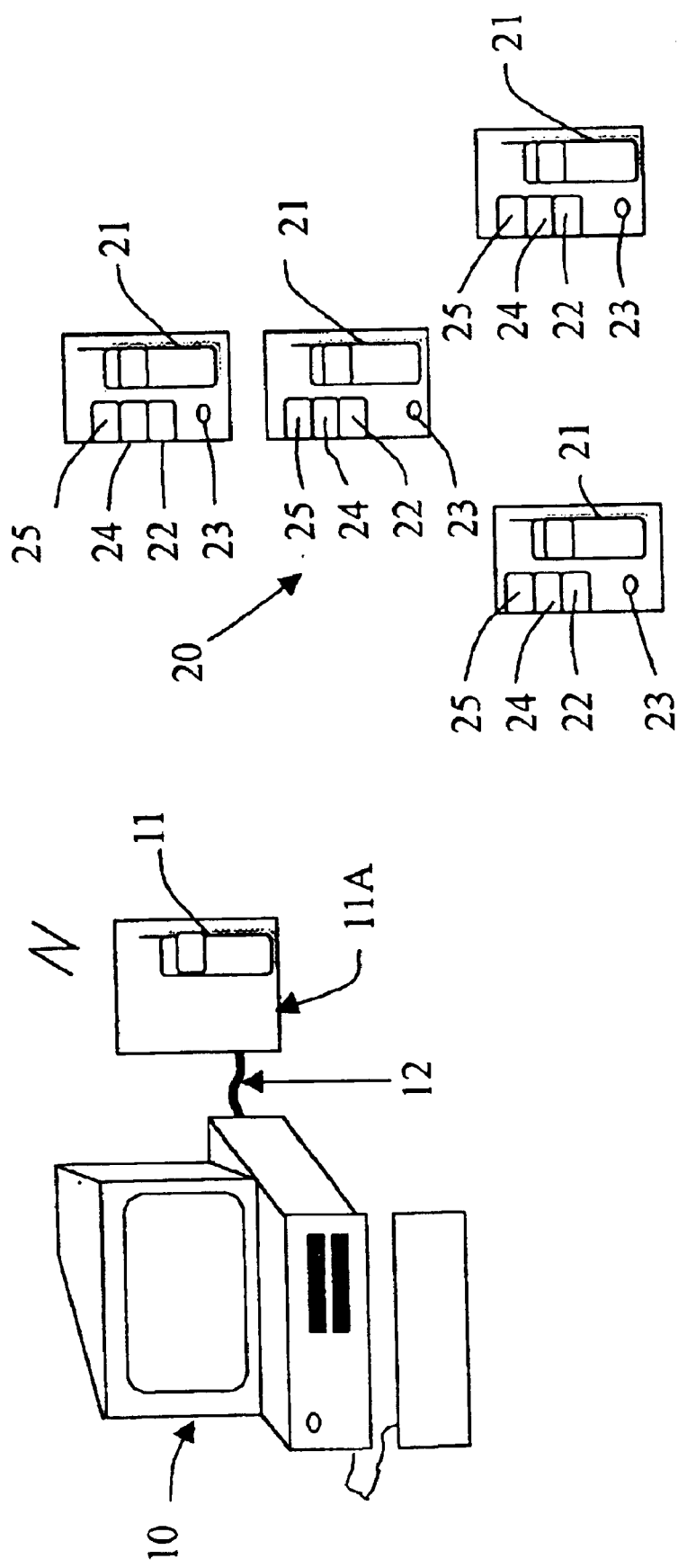
FIG. 1 is a schematic diagram showing a preferred embodiment of on-street parking toll system according to the invention in which four parking spaces are exemplified.
Figure 2:
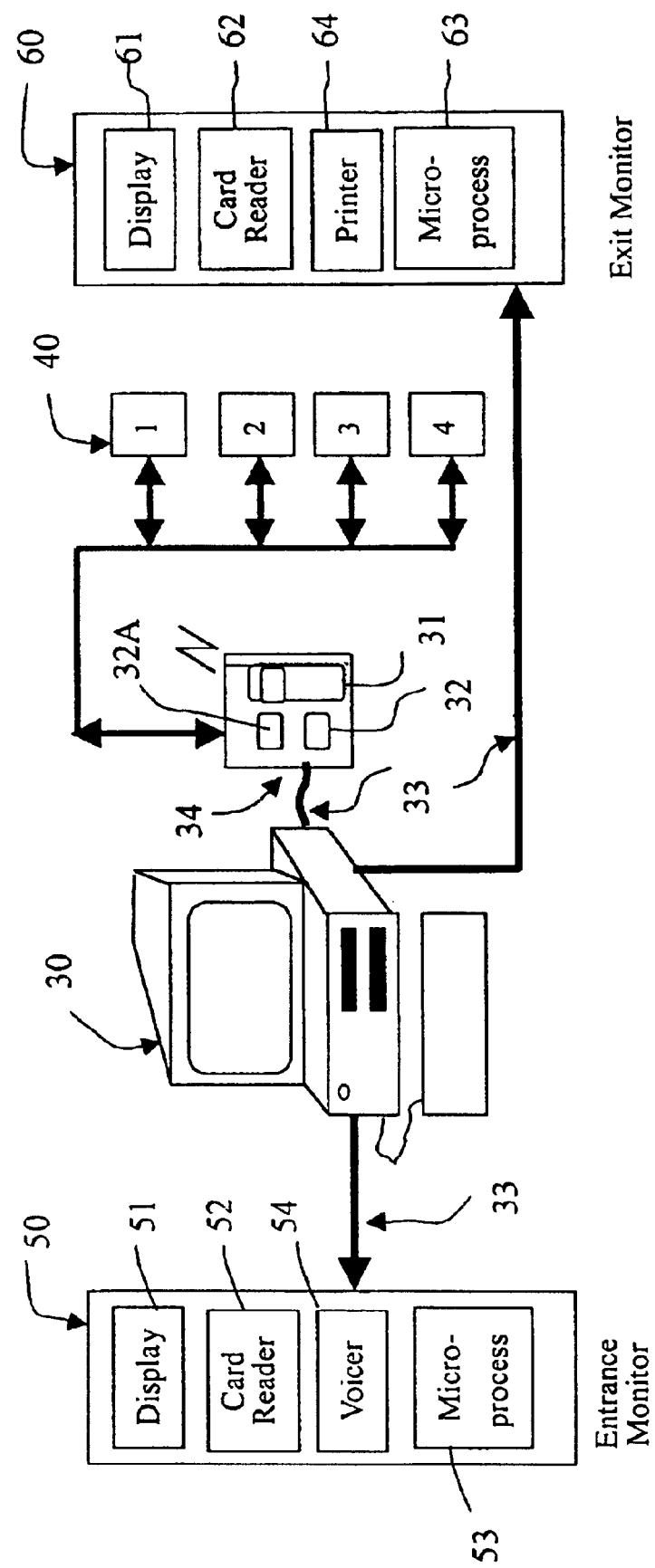
FIG. 2 is a schematic diagram showing a preferred embodiment of parking lot toll system according to the invention in which four parking spaces are exemplified.
Figure 4:
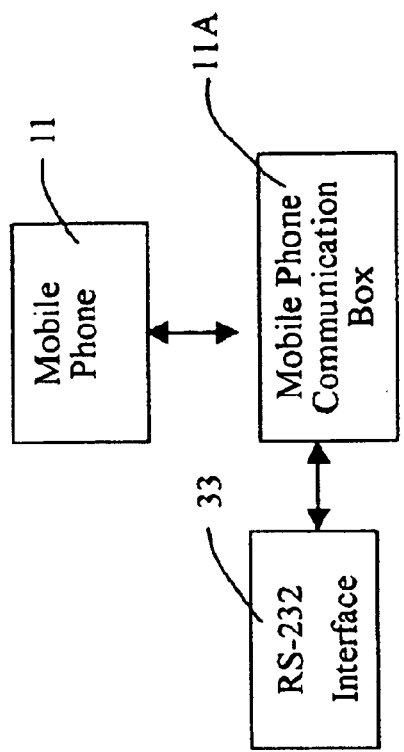
FIG. 4 is a block diagram showing the operation of parking communication box of host shown in FIG. 1.
Figure 3:
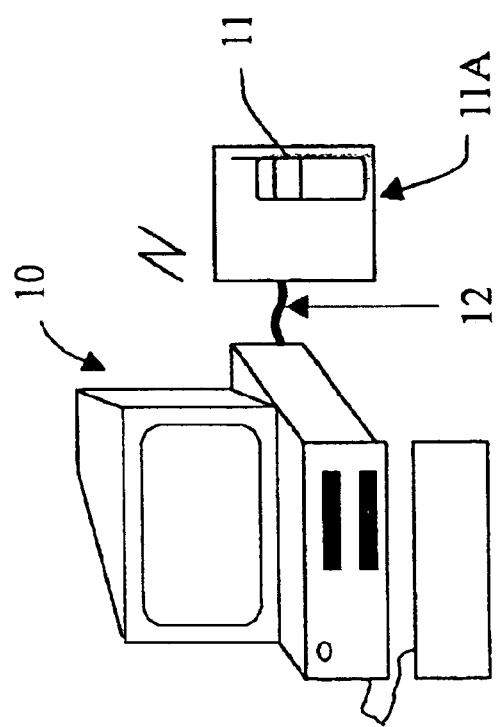
FIG. 3 is a schematic diagram showing the structure of host shown in FIG. 1.

Referring to FIGS. 1 and 3 through 7, there is shown a on-street parking toll system constructed in accordance with the invention in which four parking spaces are exemplified. The system comprises a host 10 located in parking management office (not shown), a mobile phone communication box 11A connected to host 10, and a number of parking meters 20 each located on the curb adjacent to a corresponding parking space. As shown in FIGS. 3 and 4, host 10 is implemented as a personal computer (PC) being connected to mobile phone communication box 11A through RS-232 cable 12. Through SMS (Short Message Service) unit of GSM (TMDA, AMPS, CDMA, or PCS) provided by telephone company, host 10 can manage a number of parking meters 20 and receive a plurality of parking records of the current day (including mobile phone number, parking duration, and toll) sent from mobile phone 21 of parking meter 20 in an SM (Short Message).

Figure 6:
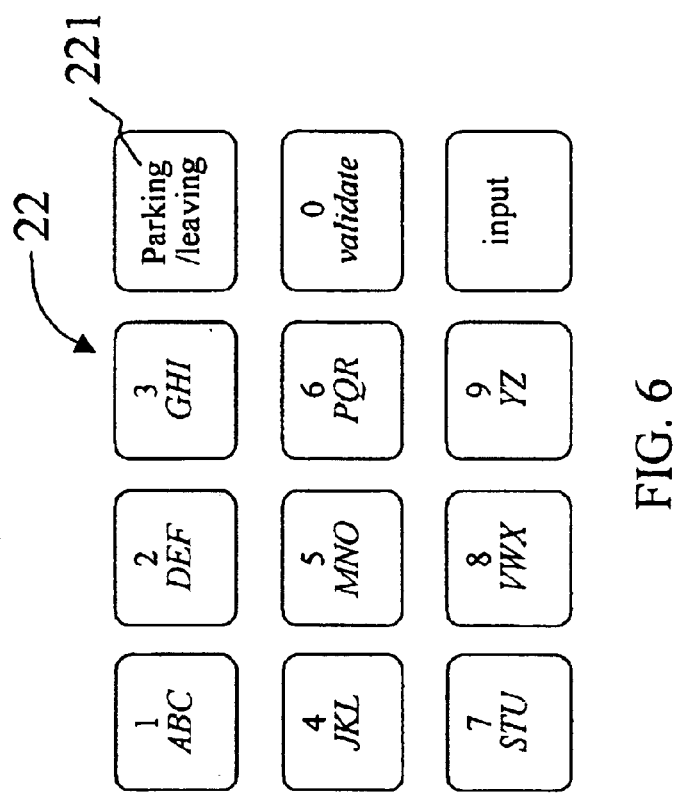
FIG. 6 is a plan view of the keypad shown in FIG. 5.
Figure 5:
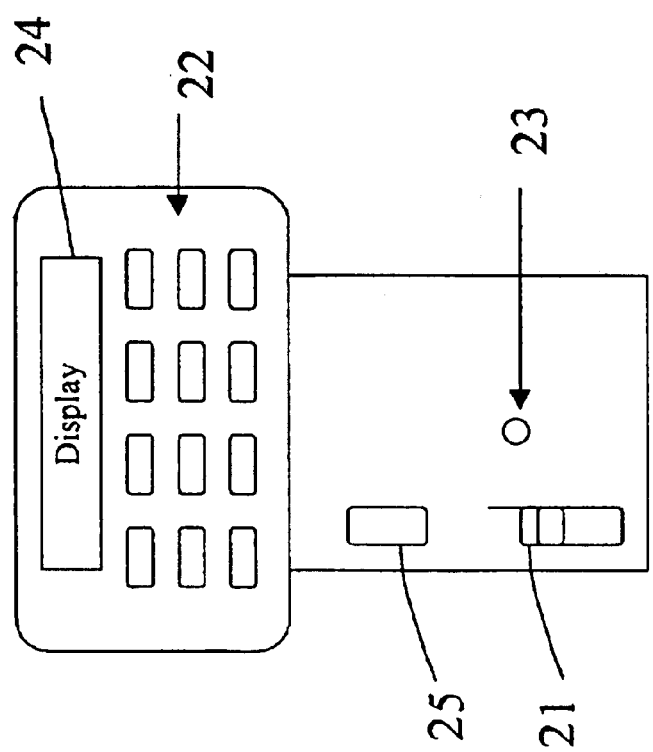
FIG. 5 is a plan view of parking meter shown in FIG. 1.
Figure 7:
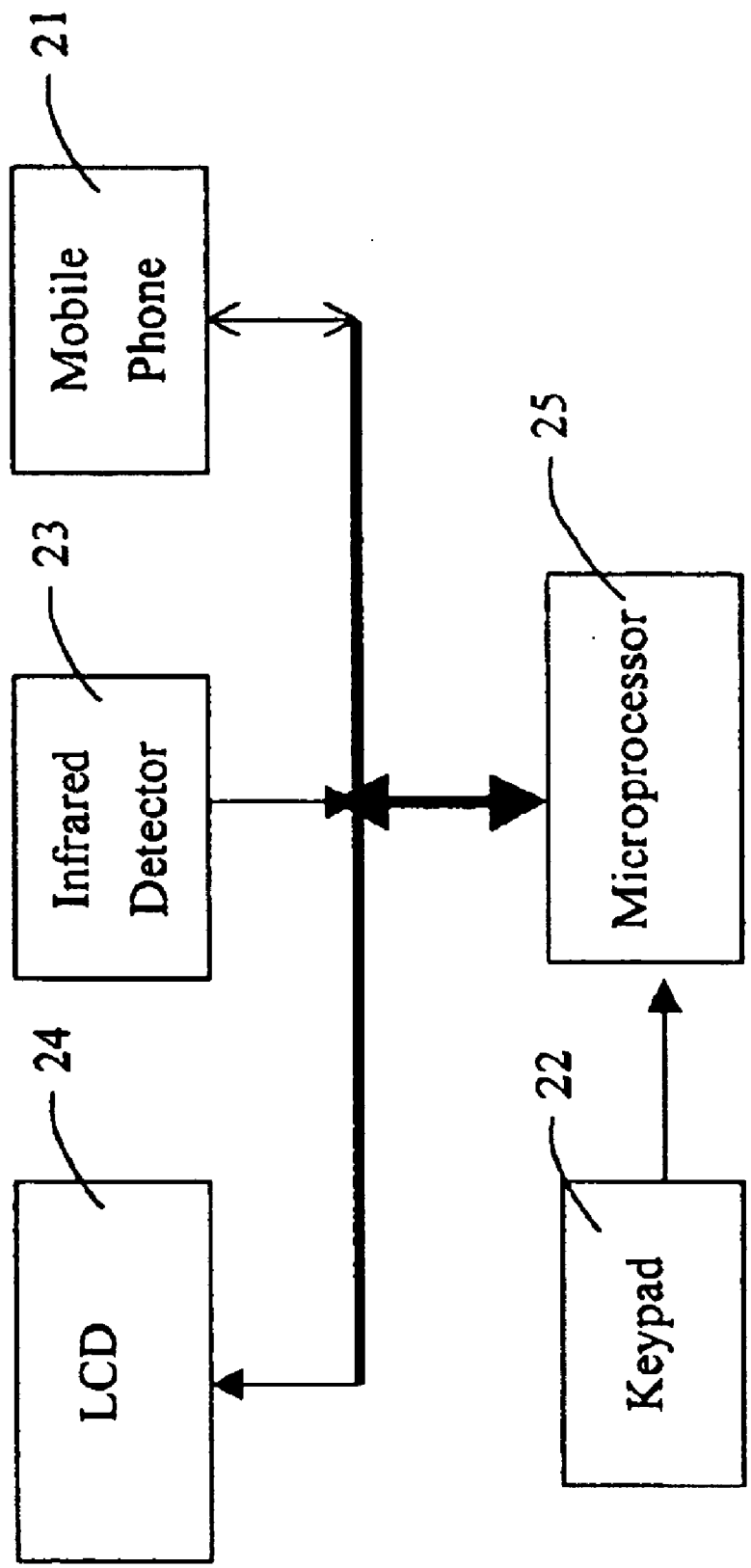
FIG. 7 is a block diagram schematically showing the operation of parking meter of FIG. 5.

As shown in FIGS. 5, 6, and 7, parking meter 20 uses an infrared detector 23 for detecting whether there is a vehicle parking at the corresponding parking space. Also, an LCD 24 for showing parking toll message, a keypad 22 for user to input digits and perform other functions, a mobile phone 21 for transmitting and receiving parking message, and a microprocessor 25 for controlling above components.

Infrared detector 23 can transmit signals to microprocessor 25 when detecting a vehicle parked in the corresponding parking space to which cause microprocessor 25 to command embedded voicer (not shown) to issue a greeting such as "Welcome. Please dial 090195278". This number is also shown on the parking meter. Driver can dial his/her own mobile phone number. LCD 24 may also show the above parking space number. As such, driver may simply dial parking space number through mobile phone to complete the parking registration. Additionally, driver may input plate number if such is required as heard through the voicer. Parking meter 20 will automatically record driver's mobile phone number and calculate parking time. At this time, LCD 24 shows the start time of parking on screen. Driver simply presses the "leaving" key 221 to finish parking. Thereafter, voicer issues a greeting such as "Please come again. Your parking duration is 2 hours 20 minutes. Toll is 64 dollars." This toll will be included in driver's monthly phone bill. As stated above, through SMS of GSM provided by telephone company, host 10 can receive a plurality of parking records of the current day sent from mobile phone 21 of parking meter 20 in an SM. Host 10 will call parking meter 20 in a regular batch manner for receiving the parking records. These parking records will be checked and filed. As a result, the parking management office can calculate the total amount of each parking occupant and the information will then be forwarded to the phone company so the tolls can be collected through phone bills.

Voicer will require driver to input password if driver inputs his/her mobile phone number through keypad 22 of parking meter 20. LCD 24 may show "Please input password" accordingly. Microprocessor 25 will immediately instruct mobile phone 21 to be on line with telephone company for validating the password once the password input is complete. LCD 24 will show the start time of parking if the password is correct and calculate the duration of occupancy immediately. Otherwise, voicer will verbally issue a message such as "Password error. Please input again." LCD 24 will show the same accordingly.

Microprocessor 25 will instruct mobile phone 21 to call toll collector through beeper about the corresponding parking space number if no parking registration is sensed after 3 minutes (or any of other predetermined time periods) when vehicle parked in the parking space is detected. As a result, toll collector can go to the corresponding parking space to inform the driver that he/she has violated the parking regulations.

Similarly, parking meter 20 can provide a plurality of parking records of the current day to host 10 in a regular batch manner through SMS of GSM. Each of such parking records comprises mobile phone number, plate number, time, date, parking duration, and toll. As a result, host 10 can effectively manage parking toll as well as request telephone company to pay the toll.

Figure 8:
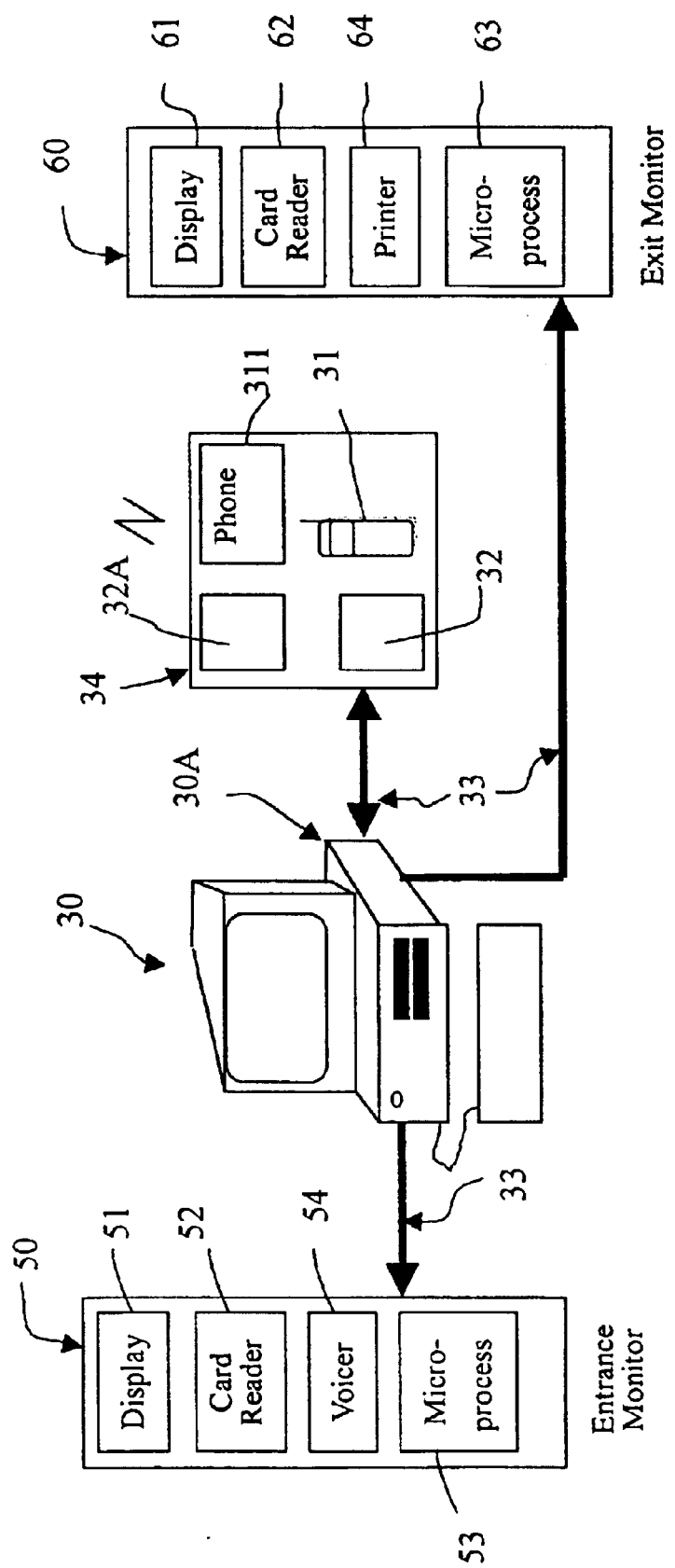
FIG. 8 is a schematic diagram showing the operation of the system shown in FIG. 2.
Figure 9:
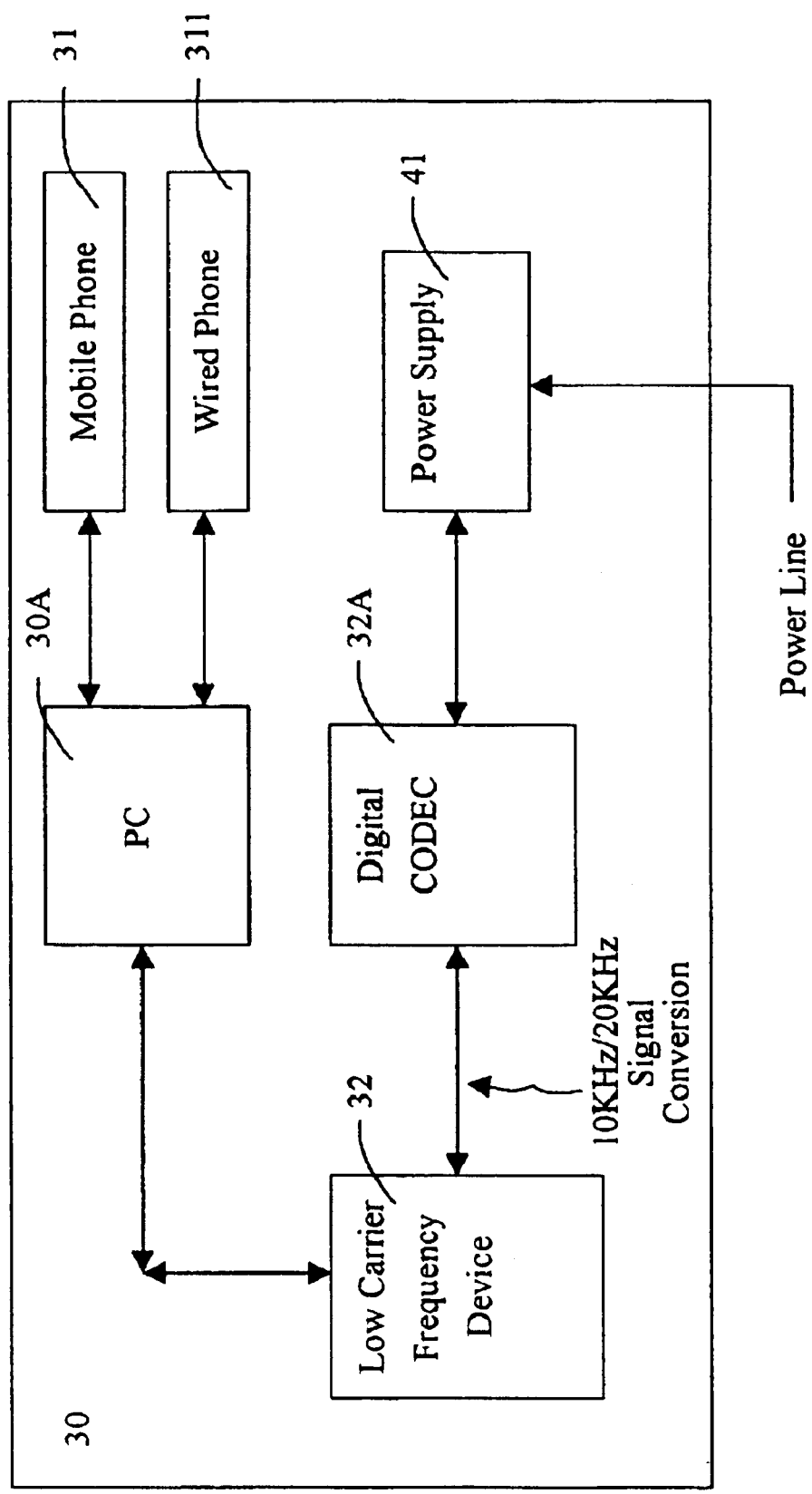
FIG. 9 is a block diagram showing the operation of host shown in FIG. 2.

Referring to FIGS. 2 and 8 through 12, there is shown a parking lot toll system constructed in accordance with the invention in which four parking spaces are exemplified. The system comprises a host 30, a mobile phone communication box 34 connected to host 30, a number of parking meters 40 each located adjacent to a corresponding parking space, an entrance monitor 50 at the entrance of parking lot, and an exit monitor 60 at the exit of parking lot. As shown in FIGS. 8 and 9, host 30 is implemented as a PC being connected to mobile phone communication box 34 through RS-232 cable 33. As shown in FIG. 8, mobile phone communication box 34 comprises a mobile phone 31 (or a dedicated phone line 311 for internet connection), a low carrier frequency device 32, a digital CODEC 32A, and associated driver programs. Entrance monitor 50 comprises a card reader 52, a display 51, a microprocessor 53, and a voicer 54. Exit monitor 60 comprises a card reader 62, a microprocessor 63, a printer 64, and a display 61. All of mobile phone communication box 34, entrance monitor 50, and exit monitor 60 are connected to host 30 through RS-232 cable 33. As such, host 30 can manage a number of parking meters 40 by performing a parking management program.

It is designed that such parking lot toll system is applied to limited parking range. As such, host and parking meters are connected through cables for sending and receiving data. Low carrier frequency device 32 is provided in the mobile phone communication box 34 of host 30 for obtaining an effective and high quality signal transmission. Low carrier frequency device 32 can convert voice signals sent from PC into 20 KHz signals. Such 20 KHz signals are further decoded as analog signals by CODEC 32A prior to broadcasting. To the contrary, when analog signals are received by mobile phone 31 (or a dedicated phone line 311 for internet connection) from parking meter 40, such analog signals will be encoded as digital voice signals by CODEC 32A. Then low carrier frequency device 32 converts the digital voice signals into 10 KHz low frequency signals prior to storing it in PC. Likewise, parking meter 40 comprises a low carrier frequency device 42 and a digital CODEC 32A for performing frequency conversion and encoding/decoding respectively, thereby obtaining a high quality signal transmission.

Figure 10:
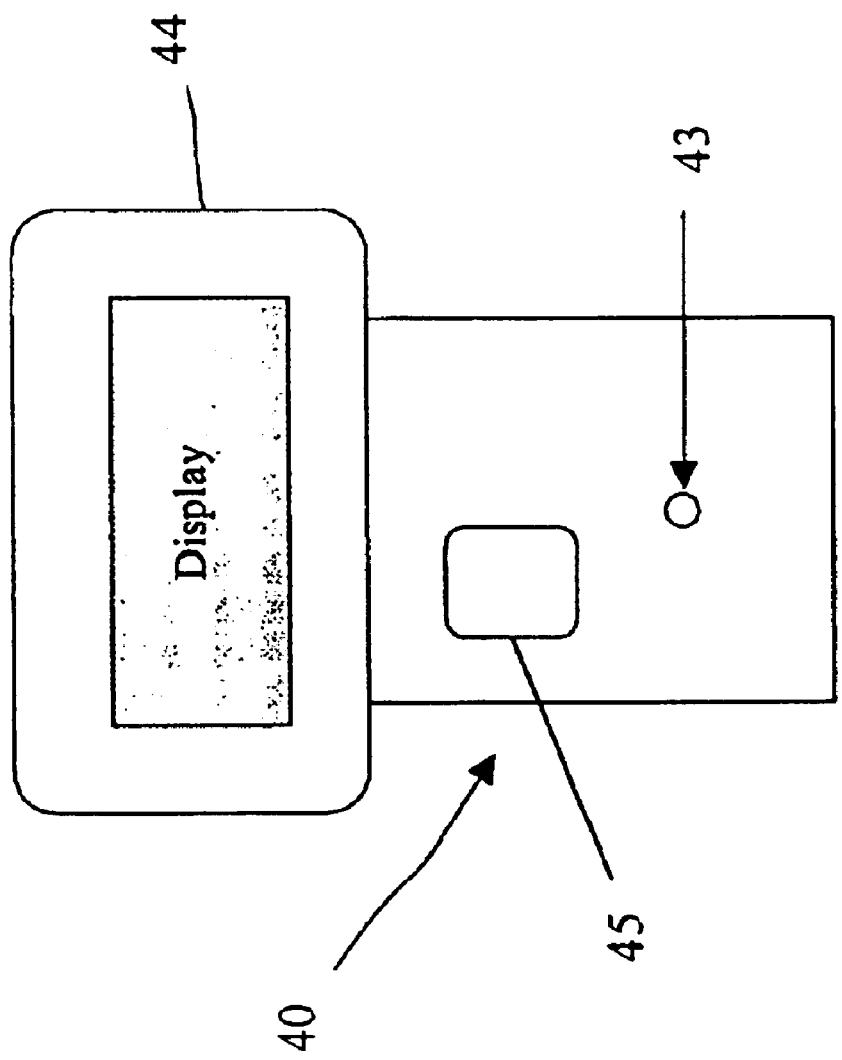
FIG. 10 is a plan view of parking meter shown in FIG. 2.
Figure 12:
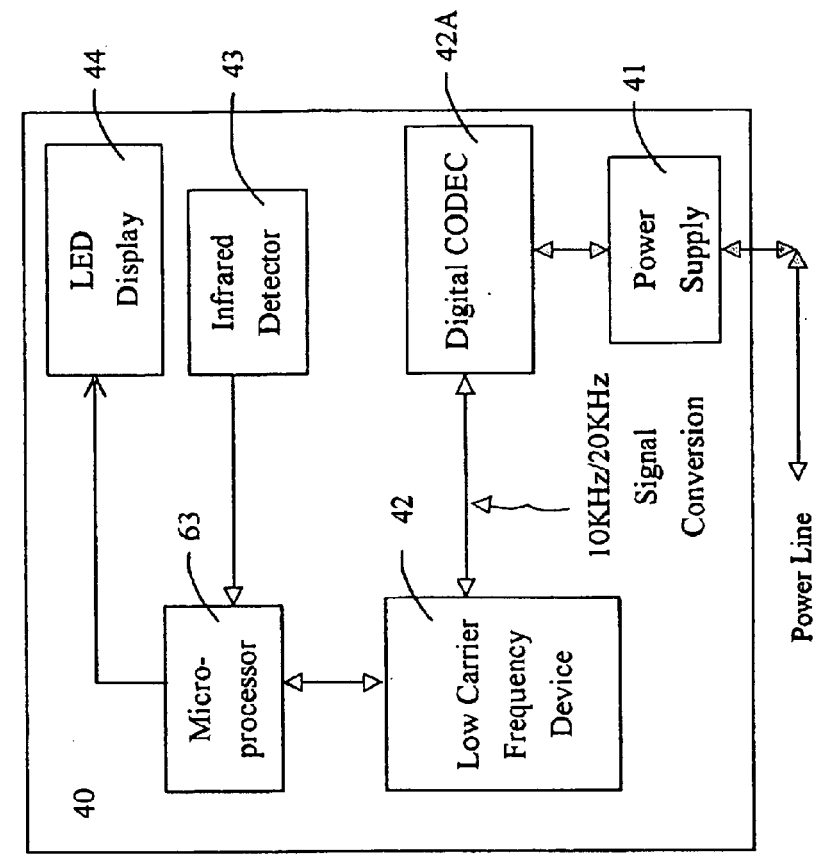
FIG. 12 is a block diagram schematically showing the operation of parking meter of FIG. 2.
Figure 11:
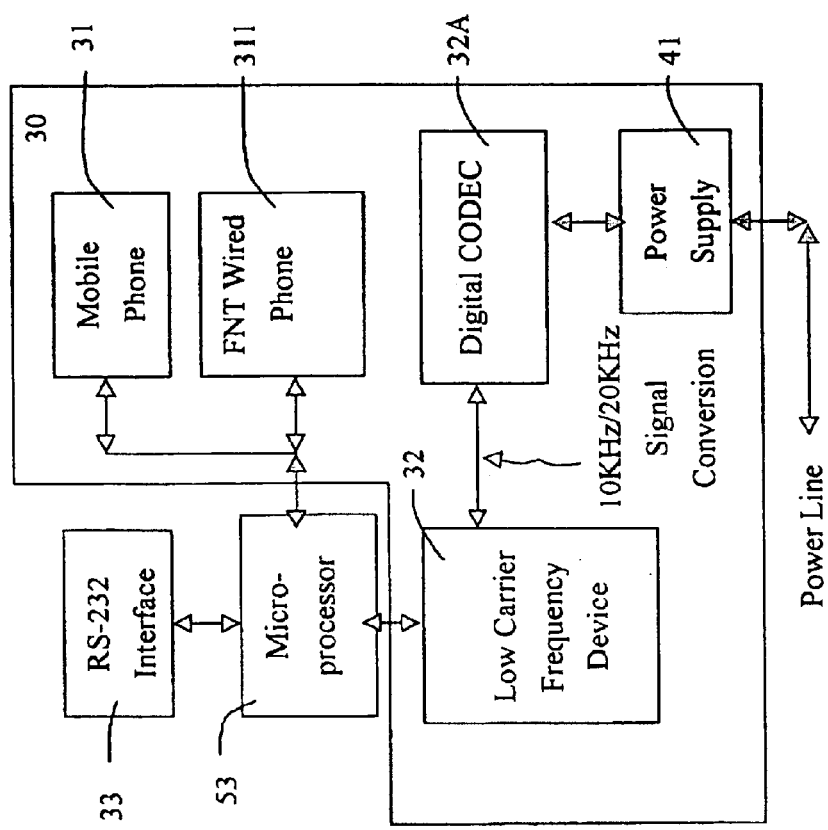
FIG. 11 is a block diagram showing the operation of parking communication box of host shown in FIG. 2.

Driver can dial parking lot telephone number through mobile phone when arriving at the entrance of parking lot. Host 30 will inform available parking space number to both driver and the corresponding parking meter 40 once it receives the above call dialed by driver. Then microprocessor 45 instructs display 44 to flash for guiding vehicle to park in the correct parking space later (FIG. 10). At the same time, microprocessor 53 of entrance monitor 50 at the entrance activates card reader 52 to print parking space number, driver's mobile phone number, and entering time and date on a card which in turn outputs from the slot of the card reader 52. Then microprocessor 53 activates display 51 to show parking space number as well as activates voicer 54 to verbally inform driver of the parking space number. Gate bar will be lifted automatically when driver tears off the card. As such, driver can drive the vehicle to the designated parking space by the guidance of display 51 and voice broadcast by voicer 54. Parking meter 40 will inform host 30 when driver completes the parking. Driver should drive his/her vehicle to the exit monitor 60 at exit when leaving. Then the driver inserts the card into card reader 62. Microprocessor 63 then immediately instructs host 30 to calculate the toll. Accordingly, host 30 informs microprocessor 63 about parking duration and toll. Then microprocessor 63 activates display 61 to show parking duration and toll. Consequently, printer 64 prints an invoice. Again, gate bar is lifted to allow vehicle to leave. Through SMS of GSM (TMDA, AMPS, CDMA, PCS, or any of other system employed by telephone company), host 30 can send parking record(s) of each parking occupant to telephone company for combining the toll in each month's phone bill. This can effect a convenient, laborsaving, and effective toll collecting environment for facilitating the management of parking facility.

As shown in FIG. 10, parking meter 40 comprises an infrared detector 43 for detecting whether there is a vehicle parked in the corresponding parking space, a large LED display 44 for showing parking space number, a low carrier frequency device 44, a digital CODEC 42A and associated driver programs. Parking meter 40 and host 30 are duplex connected such that host 30 can correctly control the parking condition of each parking meter 40.

Figure 13:
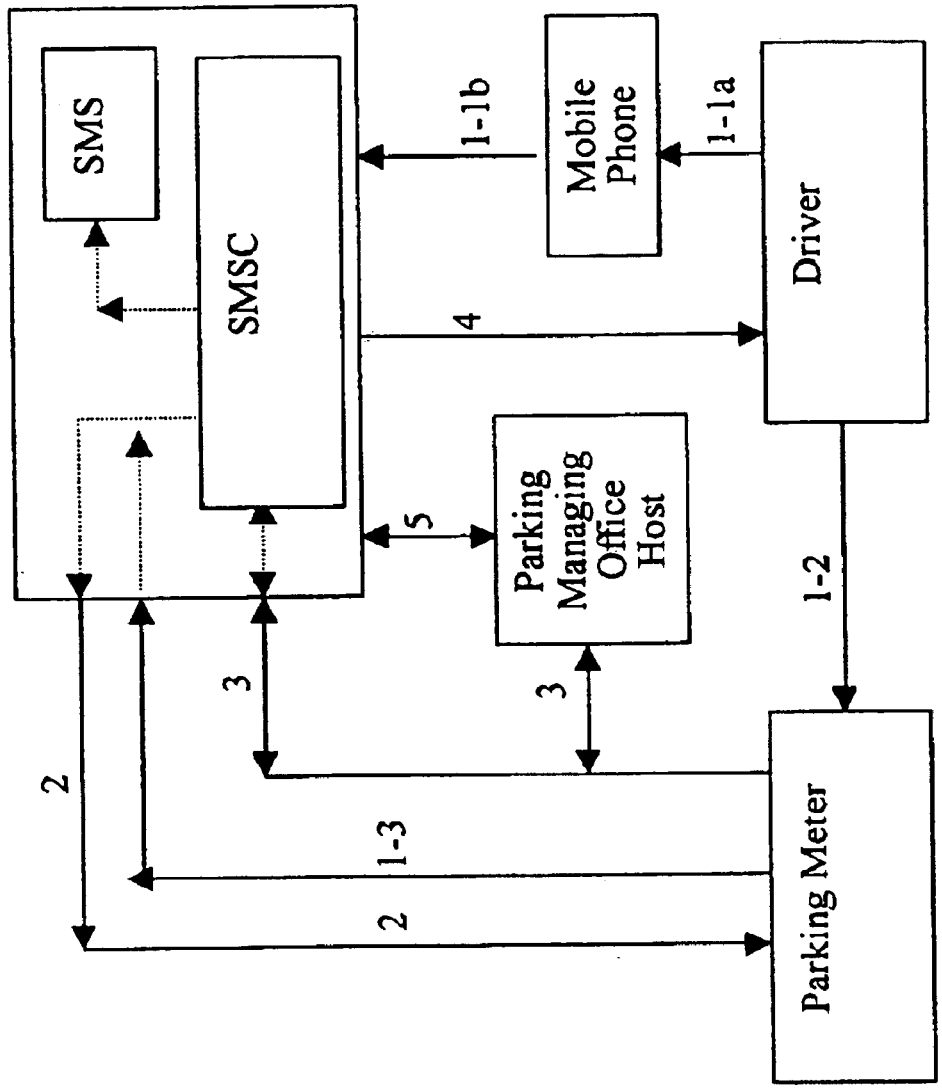
FIG. 13 is a block diagram showing the operation of on-street parking toll system of the invention.

FIG. 13 is a block diagram schematically showing the process of on-street parking toll system of the invention as detailed below.

1. At arrows 1-1a and 1-1b, driver uses his/her mobile phone to dial parking space number. Parking meter receives the call and records the number. Then timer is activated to calculate time immediately. At arrows 1-2 and 1-3, driver may input his/her mobile phone number through keypad of parking meter. Then voicer requires driver to input password by means of voicer and display. Parking meter then requests telephone company to validate the password once the password input is complete.

2. Telephone company alerts parking meter that password is correct. Then parking meter activates timer to calculate time. Additionally, driver may input plate number if such is required.

3. Driver simply presses the "leaving" key of parking meter to finish parking. Thereafter, voicer calculates the parking duration and toll. Further, parking meter provides a plurality of parking records of the current day to host and telephone company in a regular batch manner through SMS of GSM.

4. The received parking records are processed by telephone company based on phone number, time, and date to create a charge record of each parking occupant. For example, at the end of the month this charge is included in phone bill of the parking occupant.

5. The received parking records are also processed by parking management office based on phone number, time, date, and parking meter number for creating a charge record of each parking occupant. If desired, parking management office may classify and tabulate such records and check the amount with telephone company.

Figure 14:
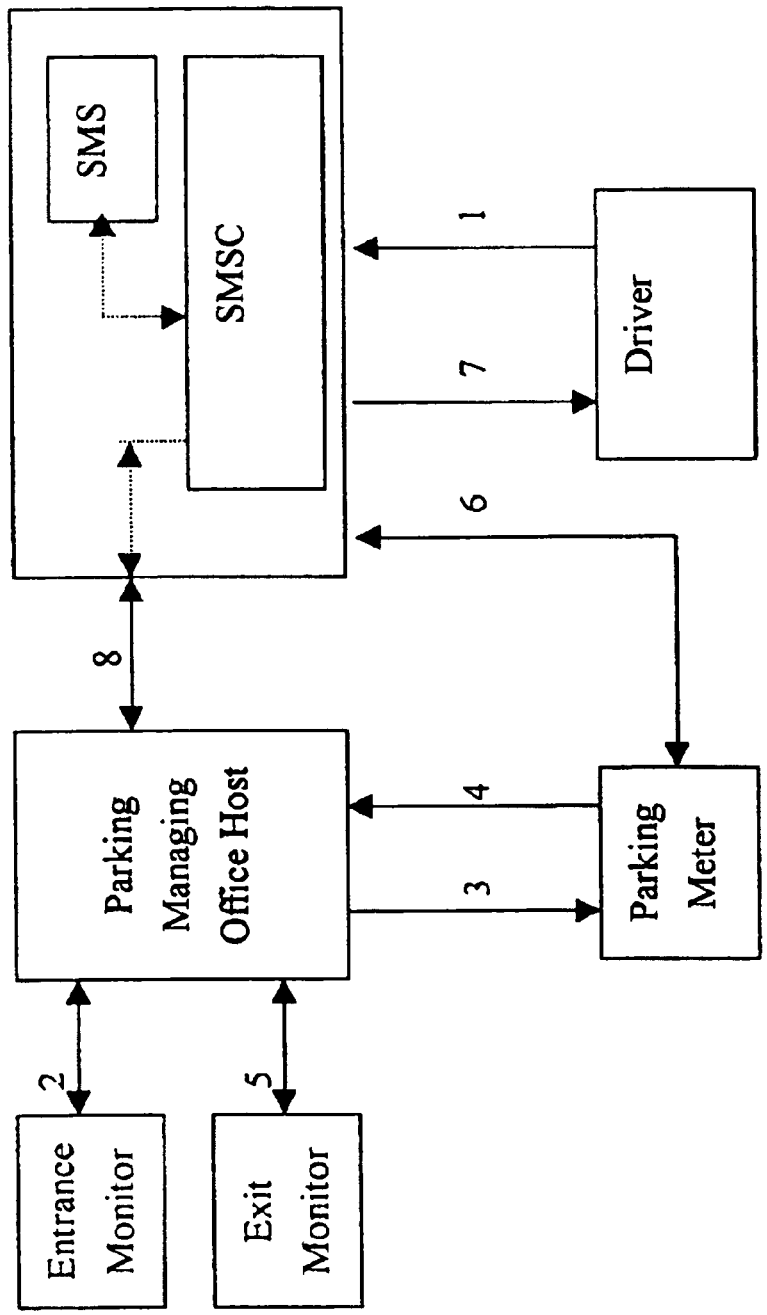
FIG. 14 is a block diagram showing the operation of parking lot toll system of the invention.
Figure 15:
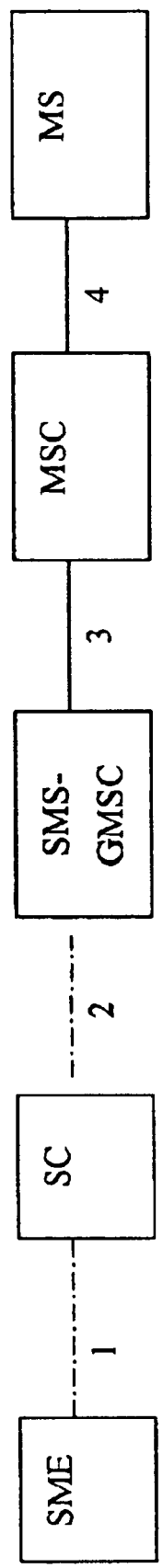
FIG. 15 is a block diagram schematically showing the SMS network structure employed in GSM in accordance with the invention.

FIG. 14 is a block diagram schematically showing the process of parking lot toll system of the invention as detailed below.

1. Driver can dial parking lot telephone number through mobile phone when arriving at the entrance of parking lot for requesting parking. Host will make a record accordingly once it receives the above call.

2. Host instructs entrance monitor 50 to activate card reader to record driver's mobile phone number and entering time and date on a card as file. Then display of entrance monitor 50 shows parking space number. Voicer also verbally informs driver of the parking space number. Gate bar will be lifted automatically when driver tears off the card.

3. Host instructs display of parking meter to flash for guiding because there is a vehicle about to park. Parking meter will inform host when driver completes parking. Host may, for example, activate speaker to request driver to drive his/her vehicle to the designated parking space if no parking registration is sensed after a predetermined time.

4. Parking meter informs host about parking condition such as whether parking is complete. Parking meter informs host that vehicle has left the designated parking space.

5. Driver drives his/her vehicle to the exit monitor 60 at exit when leaving. Then the driver inserts the card into card reader. Host calculates the parking duration and tolls and informs display to show the same. Consequently, printer prints an invoice. Again, gate bar is lifted to allow vehicle to leave.

6. Through SMS of GSM, host can send parking record(s) of each parking occupant to telephone company in a regular batch manner.

7. The parking records sent by host are processed by telephone company based on phone number, time, and date for creating a charge record of each parking occupant. For example, at the end of the month this charge is included in phone bill of the parking occupant.

8. The received parking records are also processed by parking management office based on phone number, time, and date for creating a charge record of each parking occupant. If desired, parking management office may classify and tabulate such records and check the amount with telephone company.

The on-street parking toll of the invention is summarized as below.

1. Infrared detector of parking meter instructs voicer to inform driver to perform parking registration when detecting a vehicle parked in the corresponding parking space. Infrared detector also calculates time for validating whether driver has completed parking in three minutes.

2. Parking registration is fulfilled in one of two techniques as below:

A. Driver use his/her mobile phone to dial parking space number. Then input plate number when "Please input plate number" is heard. Parking registration is fulfilled when "Thank you" is heard.

B. Use keypad of parking meter to input driver's mobile phone number. Then display visually requests driver to input password. Parking meter requests telephone company to validate the mobile phone number and password once the mobile phone number and password input is complete. Display will show "Please input plate number" if mobile phone number and password both are correct. Driver may input plate number accordingly. Parking registration is fulfilled when "Parking registration is fulfilled. Thank you" is shown on display.

3. Parking meter will call toll collector to go to the designated parking space to inform driver that he/she has violated the parking regulations if no parking registration is sensed after 3 minutes.

4. Parking meter will inform driver to input password again if password is not correct. Parking meter will inform the driver that parking service is rejected and will ask the driver to leave immediately due to incorrect password. Parking meter will call toll collector to go to the designated parking space to inform driver that he/she has violated the parking regulations if that vehicle has not left after 3 minutes. Parking meter will calculate time immediately after parking registration is fulfilled. Then parking duration and toll are shown alternatively on screen every five seconds during parking.

5. Driver simply presses the "leaving" key of parking meter to finish the parking. Thereafter, voicer stops calculating time. Then parking duration and toll are shown on display.

6. Parking meter provides a plurality of parking records of the current day to host and telephone company in a regular batch manner through SMS of GSM. Host and telephone company then process such records accordingly.

7. Telephone company will list each parking duration and toll on phone bill of the parking occupant.

8. Parking management office reserves the right to change tolls of different time periods, the longest allowable parking duration, and parking not allowed of respective parking space based on respective needs. Parking meter may be informed of such updates immediately.

The parking lot toll of the invention is summarized as below.

1. Parking registration: Driver can dial parking lot telephone number through mobile phone when arriving at the entrance of parking lot for requesting parking. Host will make a record including mobile phone number and entering time on a card of entrance monitor accordingly once it receives the above call. Entrance monitor then outputs the card and shows parking space number. Voicer and display may verbally and visually inform driver of the parking space number and requesting to tear off card. Parking registration is fulfilled when card is torn off. Voicer and display also verbally and visually inform driver accordingly if no parking space is available.

2. Parking: Host instructs parking meter that there is a vehicle about to park. Display then flashes for guiding the vehicle. Parking meter will inform host when driver completes parking.

3. Leaving: Driver drives his/her vehicle to the exit monitor at exit. Then the driver inserts the card into card reader. Host calculates the parking duration and toll and informs display to show the same. Consequently, printer prints an invoice. Gate bar is lifted to allow vehicle to leave.

4. Host provides a plurality of parking records of the current day to telephone company through SMS of GSM. Telephone company will combine toll with phone bill of the parking occupant such that parking occupant can know each parking duration and toll.

5. Monitoring and management: Host can monitor the parking spaces, parking order, calculation of parking duration and toll, and check the same with telephone company, thereby effecting an automatic parking management.

Advantages of the Invention

1. Driver is not necessary to prepare coin(s) in advance and pay the toll when arriving or leaving. Toll is included in monthly phone bill, thus simplifying parking process and affording a convenient parking environment.

2. Parking management office reserves the right to change tolls of different time periods, the longest allowable parking duration, and reservation of parking spaces for specific needs. Thus an effective utilization of parking spaces is fulfilled.

3. An automatic parking management environment can be achieved through this parking lot toll system. As to on-street parking toll, only several toll collectors are hired to deal with illegal parked drivers if such occurred. Thus it effects a convenient, laborsaving, and effective toll collecting environment for facilitating the management of parking facility.

4. No flaw. Thus toll collector embezzlement is impossible.

5. Driver does not need to worry about overcharge due to the precise calculation of parking duration.

While the invention herein disclosed has been described by means of specific embodiments, numerous modifications and variations could be made thereto by those skilled in the art without departing from the scope and spirit of the invention set forth in the claims.

What is claimed is:

1. A parking toll system comprising:

an on-street parking toll arrangement; and a parking lot toll arrangement, wherein parking management is achieved through a mobile phone or a wired phone and the parking toll is included in a parking lot user's phone bill, and wherein the parking lot toll arrangement comprises:

a host having a PC including a first mobile phone or a dedicated phone line for internet connection, a low carrier frequency device, and a first digital coder/decoder (CODEC) connected to a mobile phone communication box through a cable;

an entrance monitor, located at the entrance of the parking lot, operatively connected to the host through the cable including a first card reader, a first display, a first microprocessor and a voicer;

an exit monitor, located at the exit of the parking lot, operatively connected to the host through the cable including a second card reader, a second microprocessor, a printer, and a second display; and a parking meter including a third microprocessor, a third display, an infrared detector, a second low carrier frequency device, and a second digital CODEC.

2. A parking toll system having a controller, the system comprising:

an on-street parking toll arrangement; and a parking lot toll arrangement, wherein SMS (Short Messaging Services), WAP (Wireless Application Protocol), GPRS (General Packet Radio Services), MLS (Mobile Location Services), and a wired phone provided by telephone company are employed by a controller for transmitting and receiving data, and wherein the parking lot toll arrangement comprises:

a host having a PC including one of a first mobile phone and a dedicated phone line for internet connection, a low carrier frequency device, and a first digital coder/decoder (CODEC) connected to a mobile phone communication box through a cable;

an entrance monitor, located at the entrance of the parking lot, operatively connected to the host through the cable including a first card reader, a first display, a first microprocessor and a voicer;

an exit monitor, located at the exit of the parking lot, operatively connected to the host through the cable including a second card reader, a second microprocessor, a printer, and a second display; and a parking meter including a third microprocessor, a third display, an infrared detector, a second low carrier frequency device, and a second digital CODEC.

* * * * *

UNITED STATES PATENT AND TRADEMARK OFFICE
CERTIFICATE OF CORRECTION

PATENT NO.   : 6,796,499 B1
DATED        : September 28, 2004
INVENTOR(S)  : Wang It is certified that error appears in the above-identified patent and that said Letters Patent is hereby corrected as shown below:

Column 1,
Line 13, "coin operated" should be -- coin-operated --.
Line 51, "onstreet" should be -- on-street --.

Column 8,
Line 22, "illegal" should be -- illegally --.

Signed and Sealed this

First Day of March, 2005

JON W. DUDAS
*Director of the United States Patent and Trademark Office*